United States Patent
Veerepalli et al.

(10) Patent No.: US 9,854,588 B2
(45) Date of Patent: Dec. 26, 2017

(54) PRIORITIZATION FOR WLAN ACCESS FOR LTE MANAGING WLAN CONNECTIVITY

(71) Applicant: QUALCOMM Incorporated, San Diego, CA (US)

(72) Inventors: Sivaramakrishna Veerepalli, San Diego, CA (US); Arnaud Meylan, San Diego, CA (US); Hoon Ki Lee, San Jose, CA (US); Ajith Tom Payyappilly, San Diego, CA (US); Mahesh Kumar Kalikot Veetil, San Diego, CA (US); Umang Sureshbhai Patel, Santa Clara, CA (US); Aziz Gholmieh, Del Mar, CA (US); Manikandan Mohan, San Diego, CA (US); Dagbegnon Henri Bahini, San Diego, CA (US); Vinay Paradkar, Broomfield, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/156,682

(22) Filed: May 17, 2016

(65) Prior Publication Data

US 2016/0345334 A1 Nov. 24, 2016

Related U.S. Application Data

(60) Provisional application No. 62/165,559, filed on May 22, 2015.

(51) Int. Cl.
*H04W 28/02* (2009.01)
*H04W 72/04* (2009.01)
(Continued)

(52) U.S. Cl.
CPC ........ *H04W 72/0493* (2013.01); *H04H 20/38* (2013.01); *H04J 11/00* (2013.01);
(Continued)

(58) Field of Classification Search
CPC ..... H04W 48/18; H04W 48/16; H04W 88/06; H04W 28/10; H04W 76/02; H04W 36/22;
(Continued)

(56) References Cited

U.S. PATENT DOCUMENTS

| | | | |
|---|---|---|---|
| 2016/0119861 A1* | 4/2016 | Jin | H04W 48/16 370/338 |
| 2016/0212635 A1* | 7/2016 | Cho | H04W 92/20 |

OTHER PUBLICATIONS

Blackberry UK Limited, "Requirements to Support User Preferences," 3GPP Draft; R2-151476, 3rd Generation Partnership Project (3GPP), Mobile Competence Centre ; 650, Route Des Lucioles ; F-06921 Sophia-Antipolis Cedex ; France vol. RAN WG2, No. Bratislava, Slovakia; 20150420-20150424 Apr. 19, 2015 (Apr. 19, 2015), XP050936402, Retrieved from the Internet: URL:http://www.3gpp.org/ftp/Meetings_3GPP_ SYNC/RAN2/Docs/ [retrieved on Apr. 19, 2015] section 1 Introduction.
(Continued)

*Primary Examiner* — Phuoc H Doan
(74) *Attorney, Agent, or Firm* — Patterson & Sheridan, L.L.P

(57) ABSTRACT

Aspects relate to a priority mechanism for prioritizing network identifiers, for example SSIDs. As described herein, a UE may obtain one or more network identifier sets, each of the one or more network identifier sets having one or more network identifiers for a first RAT and a priority level, determine one or more of the network identifier sets that are under control of a second RAT, and after the determining, manage connections to the first RAT based, at least in part, on the priority level of the network identifier sets.

27 Claims, 11 Drawing Sheets

(51) Int. Cl.
- H04J 11/00 (2006.01)
- H04L 12/28 (2006.01)
- H04H 20/38 (2008.01)
- H04L 29/08 (2006.01)
- H04W 74/02 (2009.01)
- H04W 72/12 (2009.01)
- H04W 88/06 (2009.01)
- H04W 84/12 (2009.01)

(52) U.S. Cl.
CPC ........ H04L 12/2854 (2013.01); H04L 67/306 (2013.01); H04W 72/1215 (2013.01); H04W 74/02 (2013.01); *H04W 84/12* (2013.01); *H04W 88/06* (2013.01)

(58) Field of Classification Search
CPC . H04W 36/14; H04W 84/12; H04W 52/0212; H04W 24/00; H03W 28/0289; H04L 47/2475
USPC ........................ 455/451, 550.1; 370/338; 1/1
See application file for complete search history.

(56) References Cited

OTHER PUBLICATIONS

International Search Report and Written Opinion—PCT/US2016/032989—ISA/EPO—Sep. 5, 2016.

Mediatek Inc, "Network Selection and Data Aggregation with LTE-WLAN Aggregation," 3GPP Draft; R2-151681 Network Selection and Data Aggregation with LTE-WLAN Aggregation, 3rd Generation Partnership Project (3GPP), Mobile Competence Centre ; 650, Route Des Lucioles ; F-06921 Sophia-A vol. RAN WG2, No. Bratislava, Slovakia; 20150420-20150424 Apr. 19, 2015 (Apr. 19, 2015), XP050936583, Retrieved from the Internet: URL:http://www.3gpp.org/ftp/Meetings_3GPP_ SYNC/RAN2/Docs/ [retrieved on Apr. 19, 2015] section 2 Network selection for LWA section 5 Conclusions.

QUALCOMM Inc: "Discussion on System Aspects in LTE-WLAN RAN Level Integration," 3GPP Draft; S2-153978 LWA-DP System-Aspects-R4, 3rd Generation Partnership Project (3GPP), Mobile Competence Centre ; 650, Route Des Lucioles ; F-06921 Sophia-Antipolis Cedex ; France , vol. SA WG2, No. Anaheim, USA; 20151116 20151120 Nov. 16, 2015 (Nov. 16, 2015), XP051014059, Retrieved from the Internet: URL:http://www.3gpp.org/ftp/Meetings_3GPP_ SYNC/SA2/Docs/ [retrieved on Nov. 16, 2015] section 2 Network selection for LWA.

QUALCOMM Incorporated et al., "Deployment Scenarios and Requirements for LTE-WLAN Aggregation," 3GPP Draft; R2-151655 LTE WIFI Scenarios, 3rd Generation Partnership Project (3GPP), Mobile Competence Centre ; 650, Route Des Lucioles ; F-06921 Sophia-Antipolis Cedex ; France , vol. RAN WG2, No. Bratislava, Slovakia; 20150420-20150424 Apr. 11, 2015 (Apr. 11, 2015), XP050953427, Retrieved from the Internet: URL:http://www.3gpp.org/ftp/tsg_ran/WG2_RL 2/TSGR2 89bis/Docs/ [retrieved on Apr. 11, 2015] section 2.1 Assumptions and Requirements.

* cited by examiner

PRIORITIZATION FOR WLAN ACCESS FOR LTE MANAGING WLAN CONNECTIVITY

CROSS REFERENCE TO RELATED APPLICATIONS

This application claims benefit of U.S. Provisional Application Ser. No. 62/165,559, entitled "PRIORITIZATION FOR WLAN ACCESS FOR LTE-WLAN AGGREGATION," filed on May 22, 2015, which is hereby expressly incorporated by reference herein in its entirety.

BACKGROUND

Field of the Disclosure

Aspects of the present disclosure relate to a priority mechanism for managing connections between a user equipment (UE) and a first and second radio access technology (RAT) by prioritizing access across sets of wireless local area networks (WLANs).

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, Long Term Evolution Advanced (LTE-A) systems, and Orthogonal Frequency Division Multiple Access (OFDMA) systems.

A wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

In some cases, a multi-mode UE may establish and maintain connections with one or more of networks including a wireless wide area network (WWAN) (e.g., an LTE network) and a wireless local area network (WLAN) (e.g., a Wi-Fi network). Such a system may also support radio access network (RAN) aggregation, such as LTE managing WLAN connectivity (e.g., LTE+Wi-Fi aggregation). LTE+Wi-Fi aggregation may be referred to as "LWA," wherein LTE and Wi-Fi networks may aggregate their capabilities in an effort to provide ubiquitous coverage and seamless mobility to a user.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

An network identifier (for example a service set identifier (SSID)) prioritization mechanism for LTE managing WLAN connectivity is described. Multiple, configurable sets of network identifiers are used in an effort to prioritize networks and meet requirements of different operators.

Certain aspects of the present disclosure provide a method for wireless communication by a user equipment (UE). The method includes, obtaining one or more network identifier sets, each of the one or more network identifier sets having one or more network identifiers for a first radio access technology (RAT) and a priority level, determining one or more of the network identifier sets that are under control of a second RAT, and after determining that one or more of the network identifiers sets are under control of the second RAT, managing connections to the first RAT based, at least in part, on the priority level of the one or more network identifiers sets.

As described herein, the priority level (priorities) of the network identifier sets may be configurable. The UE may determine that one or more of the network identifiers sets are under control of the second RAT based on an indication broadcast from a base station. The indication may be a Long Term Evolution (LTE) network indication which indicates support for LTE managing wireless local area network (WLAN) connectivity. LTE managing WLAN connectivity may refer to a UE receiving data from an LTE network and Wi-Fi network.

The UE may be configured to receive signaling enabling or disabling managing connections to the first RAT based on the priority level.

According to aspects, the network identifier sets may include a first network identifier set with one or more network identifiers corresponding to one or more credentials configured by a user of the UE, a second network identifier set with one or more network identifiers corresponding credentials for networks that support LTE managing wireless local area network (WLAN) connectivity, and/or a third network identifier set with one or more network identifiers corresponding to one or more credentials configured by an operator.

The first network identifier set may include high-level operating system (HLOS) network identifiers configured by a user, the second network identifier set may include aggregated wireless local area network (A-WLAN) identifiers configured for LTE managing WLAN connectivity, and the third network identifier set may include HLOS low priority network identifiers configured by the operator. The third network identifier set may be provided and/or configured by one of an Access Network and Discovery Function (ANDSF) policy or a high-level operating system (HLOS) configured by an operator.

According to aspects, managing connections to the first RAT may include determining the UE is within a coverage area of at least one network identifier in the second network identifier set and at least one network identifier in the third network identifier set. The UE may prevent a connection to the first RAT using the at least one network identifier in the third network identifier set when the first RAT is under control of the second RAT. In this manner, the UE may prevent a connection to a network identifier in the third set so long as the second RAT is capable of managing the first RAT (e.g., LTE managing Wi-Fi).

According to aspects, managing connections to the first RAT may include determining the UE is not connected to a network associated with a highest priority network identifier set and attempting a connection to a network according to the priorities of the network identifier sets.

According to aspects, managing connections to the first RAT may include determining the UE is not connected to a network associated with a highest priority network identifier set, performing a periodic scan for available network identifiers based on the determination, and establishing a connection using a network identifier discovered via the periodic scan when a network signal quality associated with the discovered network identifier is greater than a threshold. The UE may suppress or disable one or more network identifiers, discovered via the scan, that belong to a network identifier set having a lower priority than a set that contains the network identifier of the established connection. The UE may report, to a base station, one or more network identifiers, discovered via the scan, that belong to a network identifier set having a higher priority than a set that contains the network identifier of the established connection.

The UE may terminate a current connection associated with a network identifier that belongs to a network identifier set having a lower priority than at least two of the network identifier sets. The UE may store the network identifier associated with the terminated connection and re-establish a connection using the stored network identifier when an established connection using a higher priority network identifier is terminated.

Certain aspects of the present disclosure provide an apparatus for wireless communication by a user equipment (UE). The apparatus includes, means for obtaining one or more network identifier sets, each of the one or more network identifier sets having one or more network identifiers for a first radio access technology (RAT) and a priority level, means for determining one or more of the network identifier sets that are under control of a second RAT, and after determining that one or more of the network identifiers sets are under control of the second RAT, means managing connections to the first RAT based, at least in part, on the priority level of the one or more network identifiers sets.

Certain aspects of the present disclosure provide an apparatus for wireless communication by a user equipment (UE). The apparatus include at least one processor configured to obtain one or more network identifier sets, each of the one or more network identifier sets having one or more network identifiers for a first radio access technology (RAT) and a priority level, determine one or more of the network identifier sets that under control of a second RAT, and after determining that one or more of the network identifiers sets are under control of the second RAT, manage connections to the first RAT based, at least in part, on the priority level of the one or more network identifiers sets. The at least one processor may be coupled with a memory.

Certain aspects of the present disclosure provide a computer readable medium having instructions stored thereon for causing a user equipment (UE) to obtain one or more network identifier sets, each of the one or more network identifier sets having one or more network identifiers for a first radio access technology (RAT) and a priority level, determine one or more of the network identifier sets that are under control of a second RAT, and after determining that one or more of the network identifiers sets are under control of the second RAT, manage connections to the first RAT based, at least in part, on the priority level of the one or more network identifiers sets.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
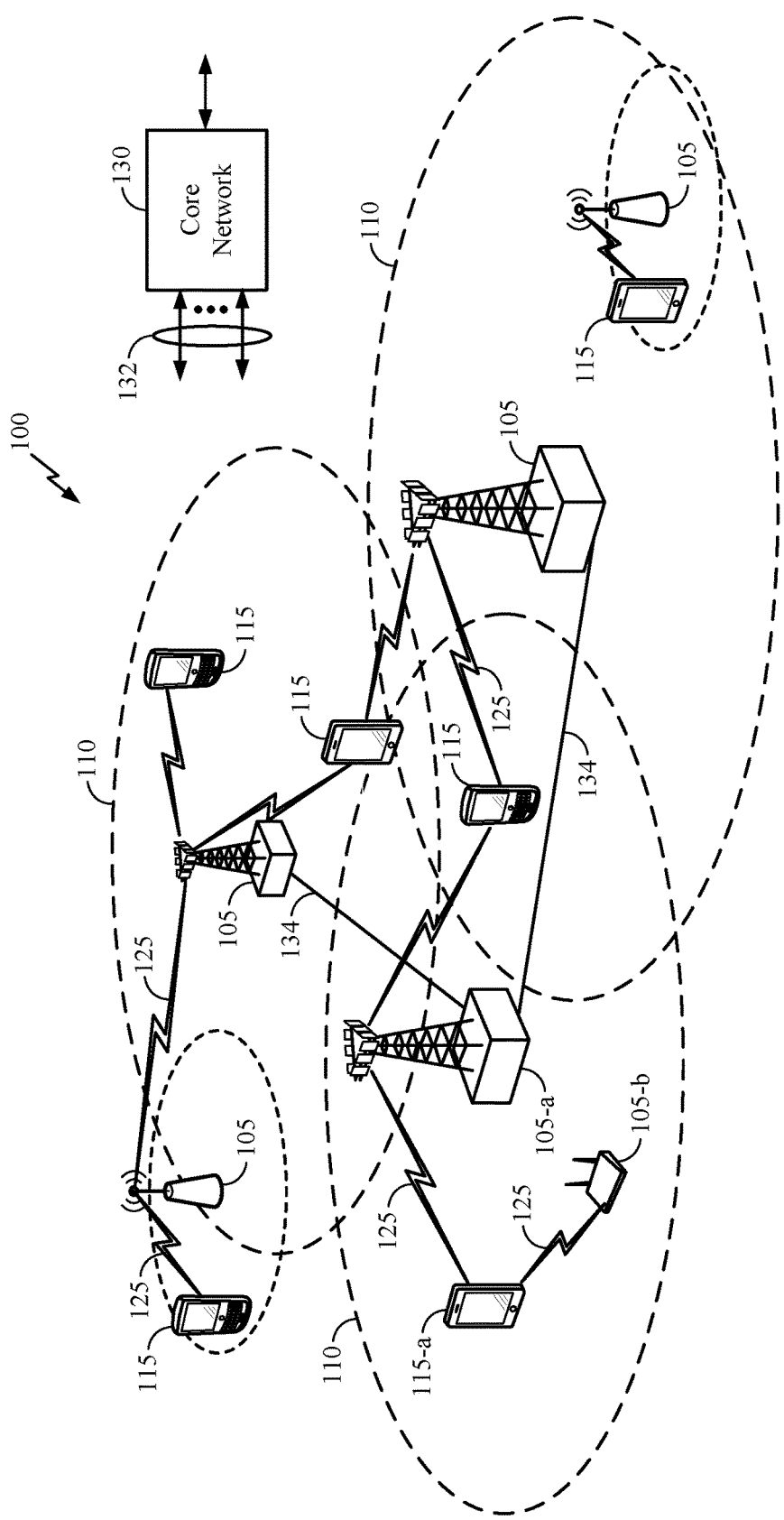
FIG. 1 illustrates an example wireless communication system, in accordance with an aspect of the present disclosure.

Aspects of the present disclosure provide techniques for prioritizing access across WLANs. As described herein, the prioritization methods may be enabled and/or disabled based on the presence of an LTE network. Handling multiple sets of SSIDs may allow a UE, when in the coverage area of an LTE eNB capable of LTE managing WLAN connectivity, to access the LTE network as opposed to certain, lower priority Wi-Fi networks.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA technique has similar performance and essentially the same overall complexity as those of an OFDMA system. However, an SC-FDMA signal has a lower peak-to-average power ratio (PAPR) because of its inherent single carrier structure. The SC-FDMA technique has drawn great attention, especially in the uplink communications where lower PAPR greatly benefits the mobile terminal in terms of transmit power efficiency. Use of SC-FDMA is currently a working assumption for uplink multiple access scheme in the 3GPP LTE and the Evolved UTRA.

An access point ("AP") may comprise, be implemented as, or known as a NodeB, a Radio Network Controller ("RNC"), an eNodeB, a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates a multiple access wireless communication system 100 in which aspects of the present disclosure may be implemented. A multi-mode UE 115-*a* may be capable of communicating via multiple RATs. For example, the multi-mode UE 115-*a* may be able to communicate with a wireless wide area network (WWAN, such as LTE) via an eNodeB 105-*a* and a WLAN (e.g., Wi-Fi) via an access point 105-*b*. The UE may obtain network identifier sets, wherein each network identifier set has one or more SSIDs for a first RAT (e.g., Wi-Fi). Further, each network identifier set may be associated with a priority level. The multi-mode UE may determine one or more of the network identifier sets that are under control of a second RAT (e.g., LTE) and the first RAT. After the determining that one or more of the network identifier sets are under control of the second RAT and the first RAT, the multi-mode UE may manage connections to the first RAT based, at least in part, on the priorities of the network identifier sets.

Referring to FIG. 1, a multiple access wireless communication system in accordance with certain aspects of the present disclosure is illustrated. FIG. 1 illustrates an exemplary multi-mode user equipment (UE) 115-a.

The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various embodiments. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In embodiments, the wireless communications system 100 is an LTE/LTE-A network communication system. In LTE/LTE-A network communication systems, the terms evolved Node B (eNodeB) may be used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell covers a relatively large geographic area (e.g., several kilometers in radius) and may allow unrestricted access by UEs 115 with service subscriptions with the network provider. A pico cell would cover a relatively smaller geographic area (e.g., buildings) and may allow unrestricted access by UEs 115 with service subscriptions with the network provider. A femto cell would also cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operations. For synchronous operations, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

As previously noted, in certain examples, a UE 115 may be capable of simultaneously communicating with multiple eNodeBs 105. When multiple eNodeBs 105 support a UE 115, one of the eNodeBs 105 may be designated as the anchor eNodeB 105 for that UE 115, and one or more other eNodeBs 105 may be designated as the assisting eNodeBs 105 for that UE 115. For example, an assisting eNodeB 105 is associated with a local gateway communicatively coupled to a packet data network (PDN), core network resources may be conserved by offloading a portion of network traffic between the UE 115 and that PDN through the local gateway of the assisting eNodeB 105 rather than transmitting the traffic through the core network 130.

As described above, a multi-mode UE 115-a may be capable of communicating via multiple RATs. For example, UE 115-a may be able to communicate with a WWAN via an eNodeB 105-a and a WLAN via an access point 105-b. As described below, an eNode B 105-a may broadcast an indication to a UE 115-a indicating support for LTE managing WLAN connectivity (e.g., LTE+Wi-Fi aggregation (LWA), LTE-WLAN Radio Level Integration with IPsec Tunnel (LWIP) and/or RAN Controlled LTE WLAN Interworking (RCLWI)). Upon receiving such an indication, the UE may implement the prioritization techniques described herein.

Figure 2:
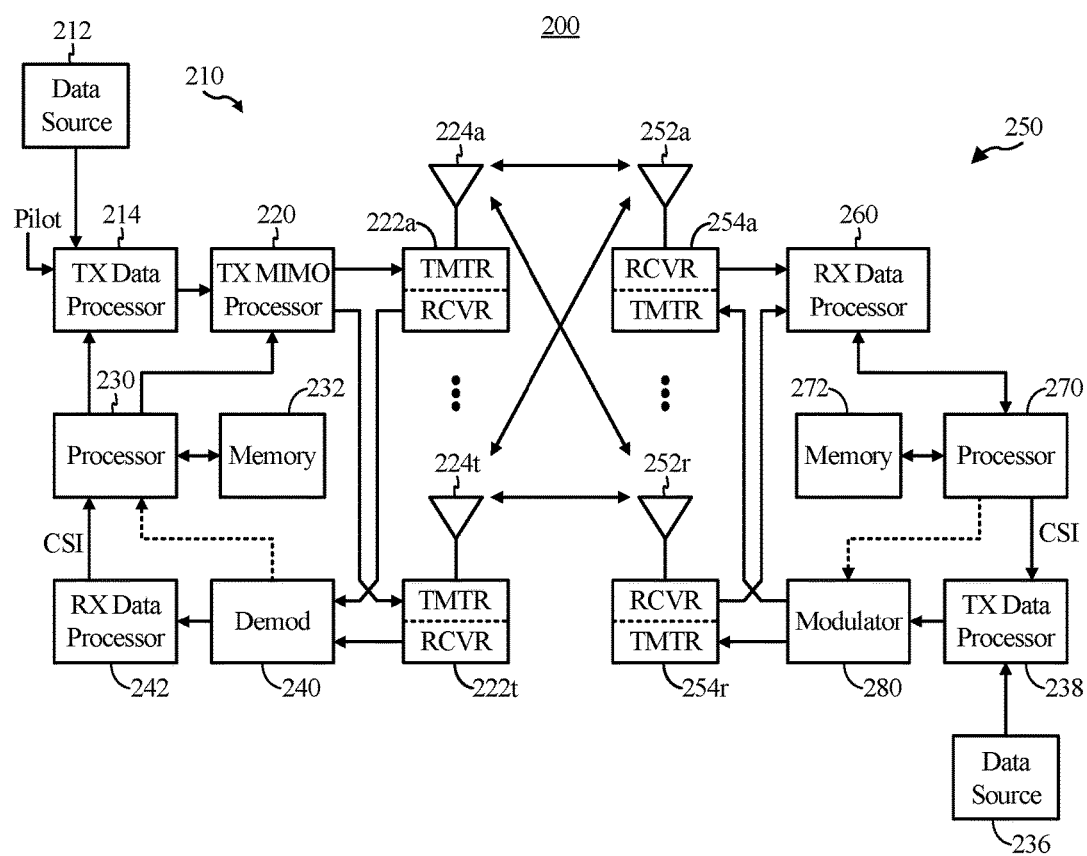
FIG. 2 illustrates a block diagram of an access point and a user terminal, in accordance with certain aspects of the present disclosure.

FIG. 2 illustrates example components of the base station/eNB/access point 105 and the UE/access terminal/mobile station 115-a illustrated in FIG. 1, which may be used to implement aspects of the present disclosure. One or more components of the eNB 105 and UE 115-a may be used to practice aspects of the present disclosure. For example, antennas 252, processor 270, transmitter/receiver 254, and/or memory 272 may be used to perform the operations and/or call flows described herein and illustrated with reference to FIGS. 6A and 6B.

FIG. 2 illustrates a block diagram of a transmitter system 210 (also known as a base station/eNB/access point) and a receiver system 250 (also known as an access terminal/UE/mobile station) in a multiple-input multiple-output (MIMO) system 200.

At the transmitter system 210, traffic data for a number of data streams is provided from a data source 212 to a transmit (TX) data processor 214. In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to NT transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the NR received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

Figure 6A:
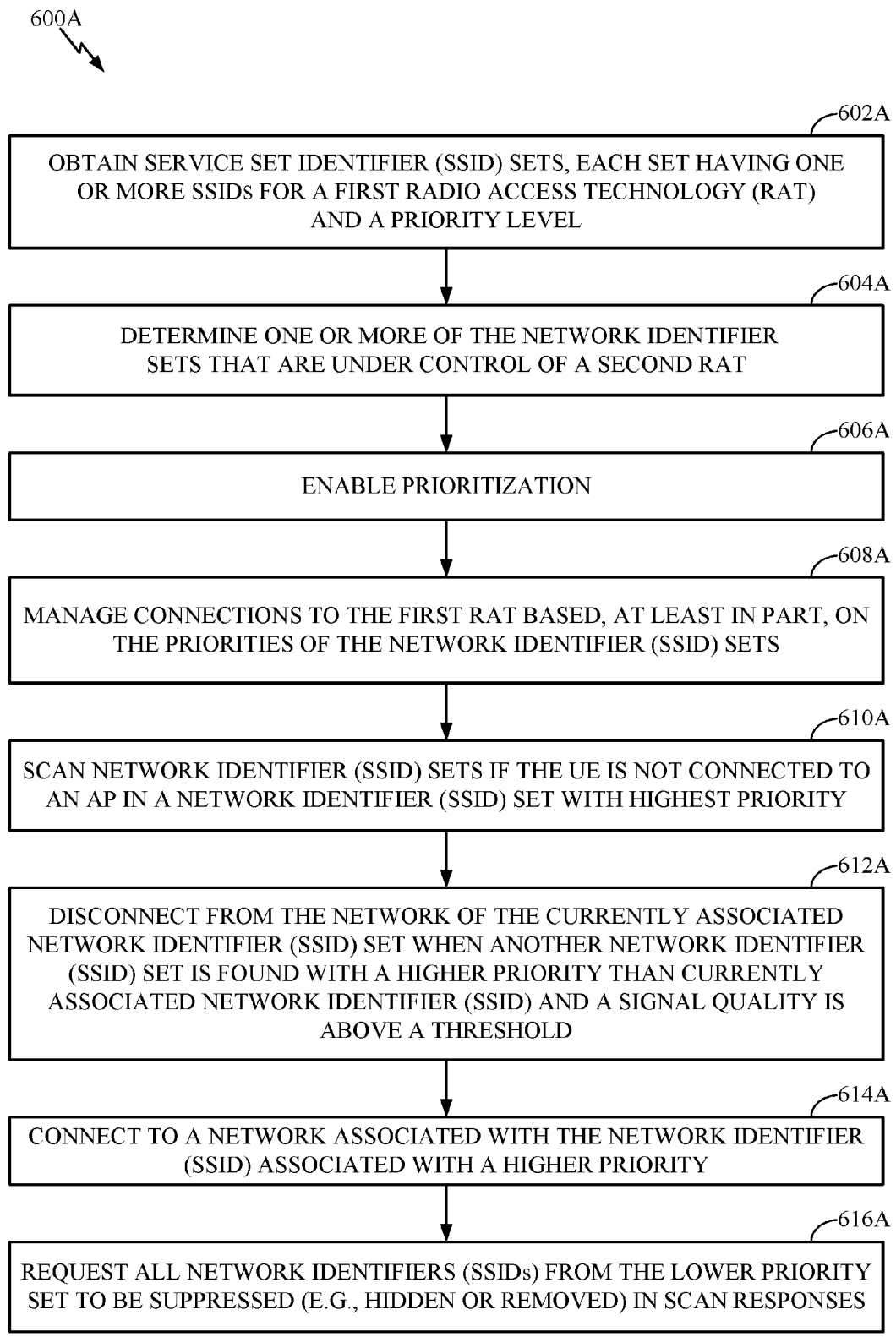
FIGS. 6A and 6B illustrate example operations, which may be performed by UE for network identifier (e.g., SSID) prioritization, in accordance with certain aspects of the present disclosure.
Figure 6B:
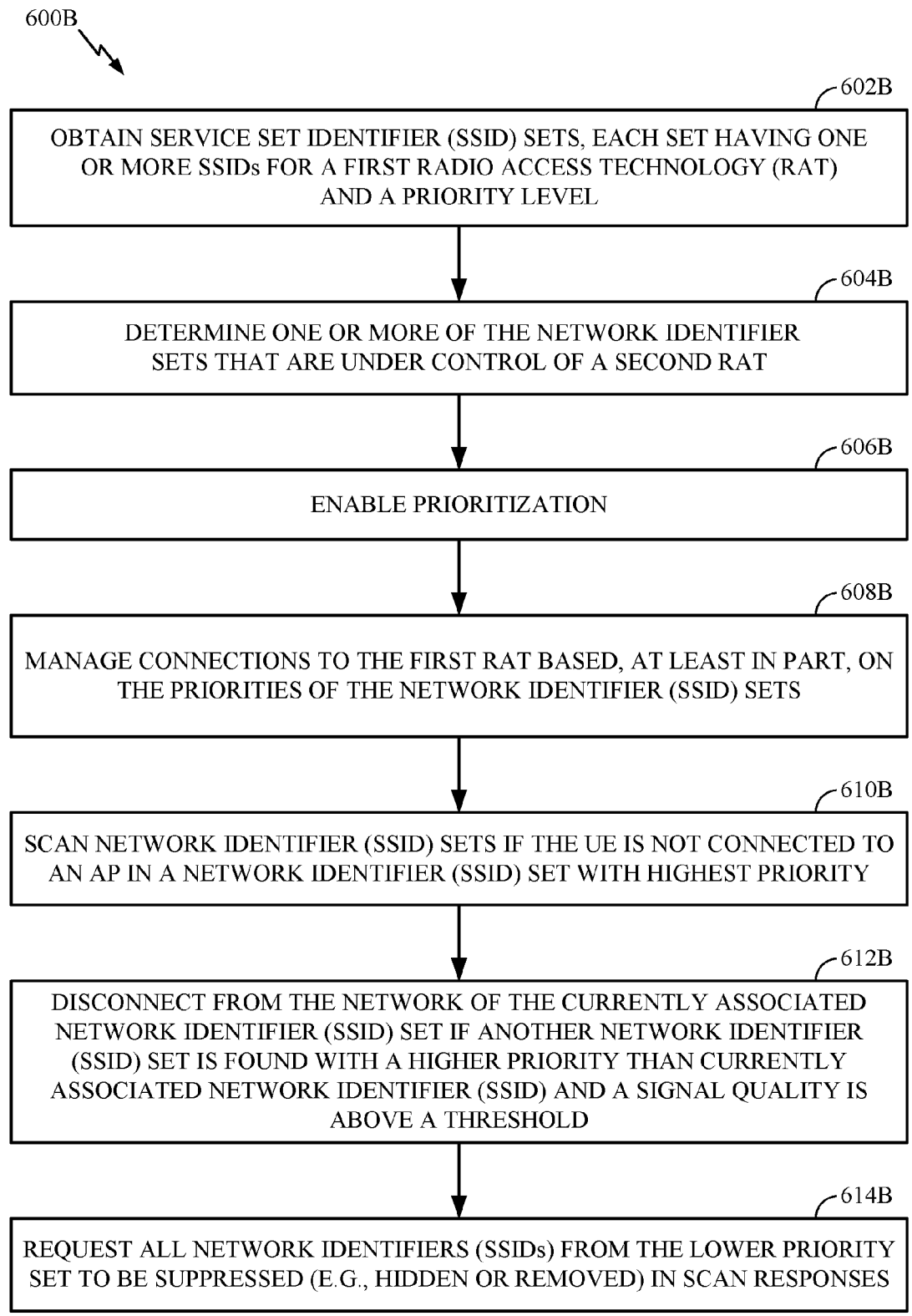

One or more of processor 270, RX data processor 260, and TX data processor 238 may direct receiver system 250 in performing operations 600, illustrated in FIGS. 6A and 6B, according to certain aspects of the present disclosure. Memory 272 may store instructions or code to be executed by the processor, the RX data processor, and the TX data processor when directing the receiver system in performing operations 600A and 600B.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
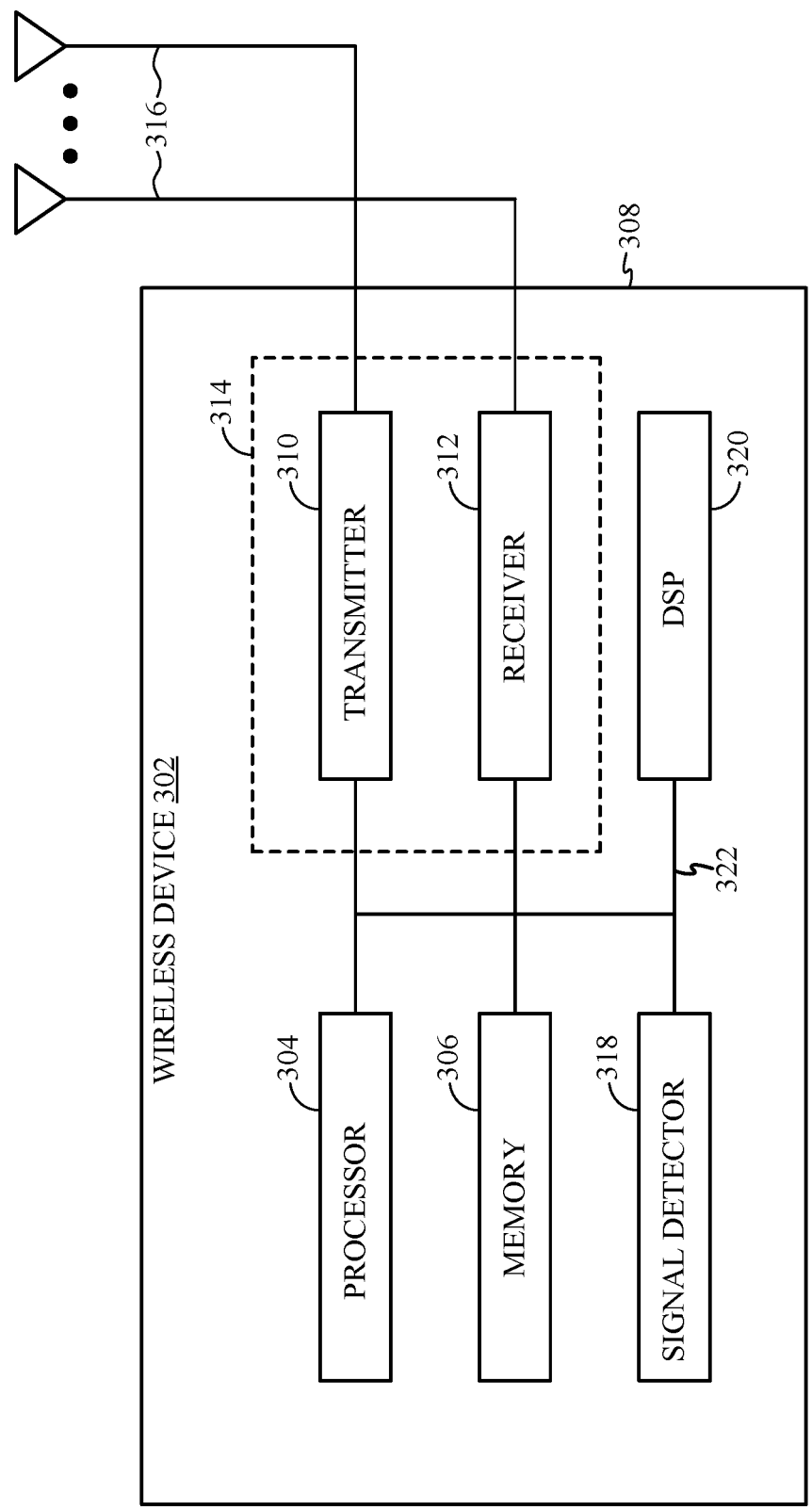
FIG. 3 illustrates various components that may be utilized in a wireless device, including a user terminal and/or an access point, in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. For example, the wireless device 302 may be used to perform the operations and/or call flows described herein and illustrated with reference to FIGS. 6A and 6B. The wireless device 302 may be multi-mode UE 115-a, as illustrated in FIG. 1.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
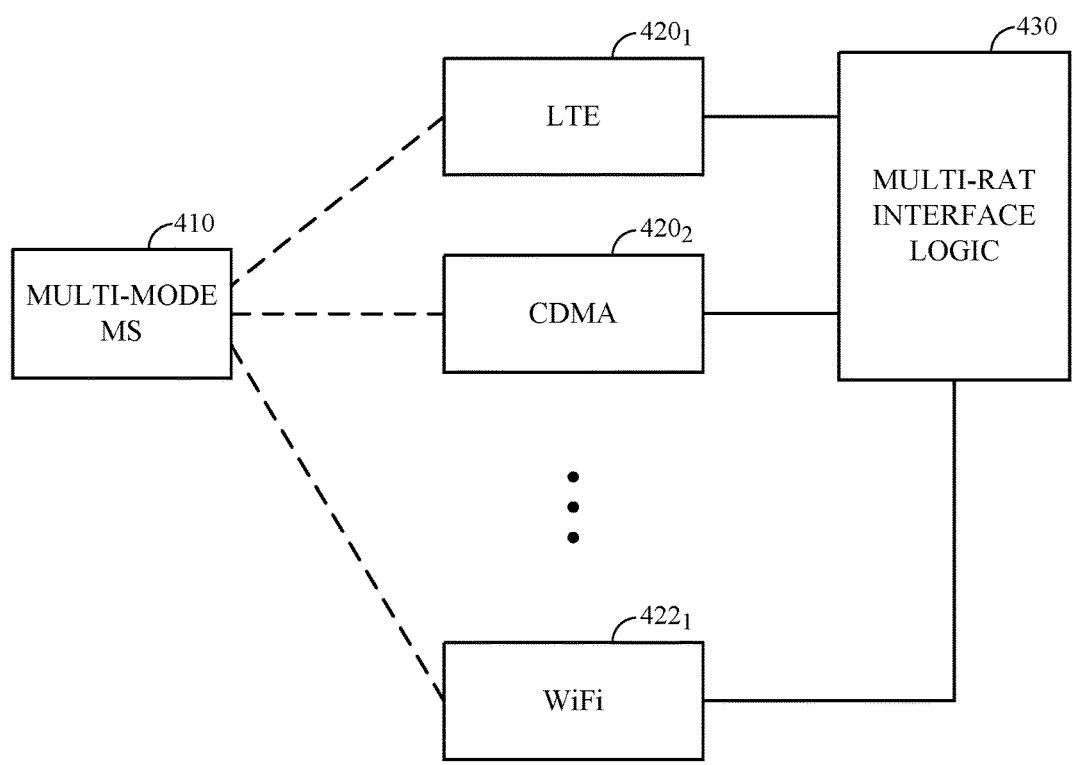
FIG. 4 illustrates an example multi-mode mobile station, in accordance with certain aspects of the present disclosure.

As described above, in order to expand the services available to subscribers, some multi-mode UEs support communications with multiple radio access technologies (RATs). For example, as illustrated in FIG. 4, a multi-mode UE 410 may support LTE for broadband data services and code division multiple access (CDMA) for voice services. Illustratively, LTE is shown as a first RAT $420_1$, CDMA is shown as a second RAT $420_2$, and Wi-Fi is shown as a third RAT $422_1$. The multi-mode UE 410 may use a multi-interface logic module 430 to support communications with the multiple RATs.

LTE Managed WLAN Connectivity SSID Prioritization

A UE may be configured, by user or operator, to prioritize access to one or more preferred networks (e.g., Wi-Fi). In certain scenarios, a UE connected to such a Wi-Fi network may not search for or connect to other networks. As an example, absent features described herein, even if the UE is in a coverage area capable of LTE managing WLAN connectivity (such as LWA), the UE may not connect to the LTE network. Aspects of the present disclosure provide prioritization methods for network selection in an effort to address this scenario. LTE managing WLAN may refer to LTE controlling WLAN connectivity as well as the flow of data from the LTE network over the WLAN data interface.

As will be described in more detail below, wireless communication operators may desire priority rules for network selection by a multi-mode UE. Operators may have different requirements or preferences, for example, driven by business models, which determine which interface is used. Presently, when WLAN is present, the UE may be prevented from connecting to LTE which, in turn, prevents LTE managing WLAN connectivity, such as LTE+Wi-Fi aggregation. For LTE managing WLAN connectivity, operators may benefit from prioritizing a UE's connection to network identifiers, for example, service set identifiers (SSIDs). A SSID is a case sensitive, 32 alphanumeric character identifier for a WLAN network. It is attached to the header of some data packets sent over a WLAN. When a mobile device tries to connect to the basic service set (BSS), the SSID acts as an identifier. To enable effective roaming, the SSID may be common across various WLAN access points.

While aspects described herein may refer to LWA, the prioritization methods may be applied to any type of LTE managing WLAN connectivity. Non-limiting examples of LTE managing WLAN connectivity include LWA, LWIP, and RCLWI.

Techniques described herein divide the set of network identifier (e.g., SSID) credentials into a few (or plurality of) sets and assign priorities (e.g., a priority level) to the sets. In other words, each set of the network identifiers may be associated with a priority. In one example, the set of SSID credentials may be divided into three sets, where prioritization among different SSID sets are given. Aspects of the present disclosure provide techniques for prioritizing SSID sets and managing connections based on the priority of the sets.

A UE's connection to a Wi-Fi network may be performed automatically (e.g., by a high-level operating system (HLOS)). However, the UE's connection to an LTE network may involve assistance from the LTE control plane. Advantageously, the prioritization techniques described herein may allow a multi-mode UE to detect and connect to an LTE network, based on priority rules, rather than remaining connected to the Wi-Fi network. An eNB of the LTE network may be capable of establishing an LTE managing WLAN connection with the UE. As described above, LTE managing WLAN connectivity may refer to the LTE eNB controlling which WLAN AP the UE selects and connects to and splitting the LTE data payload such that some traffic is tunneled over Wi-Fi and the rest is transmitted natively over LTE. Accordingly, LTE managing WLAN may refer to a technique for a UE to receive data from an LTE network and Wi-Fi network.

According to aspects, SSID sets may be created such that a first SSID set, Set 1, includes credentials configured in the HLOS of a UE by user. The first SSID set, Set 1 may include, for example, credentials for connecting to a user's preferred networks, such as a home or work Wi-Fi network. A second SSID set, Set 2, may include identifiers or credentials configured for WLAN networks managed by LTE, to enable features such as LWA, LWIP, and/or RCLWI. A third SSID set, Set 3, may include credentials configured in the HLOS to provide access to an operator's Wi-Fi network (e.g., Wi-Fi operator, where Wi-Fi is used standalone from LTE). According to this example, while Set 1 may be configured by a user, Set 2 and Set 3 may be configured by the operator. As noted above, connection to networks using a network identifier belonging to Set 1 and Set 3 may be performed automatically by the HLOS, whenever they are detected. Instead, connection to a network associated with an identifier in Set 2 may only occur under the control of an LTE eNB, using dedicated signaling. In order to avoid an automatic connection to network associated with an identifier in Set 3, which would block a connection to LTE network, according to aspects, a lower layer may apply prioritization among Set 1, Set 2, Set 3, and a connection to an LTE network.

In some cases, the relative priority of the SSID sets may be configurable. For example, the WLAN and UE may be configured (e.g., pre-configured, configured by radio resource control (RRC), configured by policy, etc.) such that Set 1 may have the highest priority, followed by Set 2 and Set 3 (e.g., Set 1>Set 2>Set 3). In some cases, the relative priority of the SSIDs may be limited to a subset of the SSID sets. For example, the relative priority of the SSIDs may ignore one or more sets of SSIDs. In some cases, the priority ordering may ignore a set of SSIDs, such as Set 3, and prioritize Set 1 over Set 2 (e.g., Set 1>Set 2). In another aspect, the priority ordering may ignore Set 3 and prioritize Set 2 over Set 1 (e.g., Set 2>Set 1). According to these examples, the UE may choose to ignore the set of SSIDs configured by an operator.

Further examples of configurable, relative priority include prioritizing LTE-WLAN aggregation SSIDs over HLOS SSIDs (e.g., Set 2>Set 1 or Set 3). Alternatively, HLOS SSIDs may have a higher priority than LTE-WLAN aggregation SSIDs (Set 1 or Set 3>Set 2).

As will be described in more detail herein, the relative priority may apply conditionally based on availability of a network (associated with a network identifier set) as well as a conditional indication from an LTE network. For example, if a UE is not connected to a network associated with a highest priority network identifier set (e.g., Set 1), the UE may disconnect from the currently-connected network and may connect to LTE until the LTE network commands a connection to an SSID associated with Set 2. The UE may not allow connection to a network associated with an SSID of Set 3 as long as the UE is connected to LTE. According to aspects, the UE may not allow connection to a network associated with an SSID of Set 3 even when the LTE network does not command a connection to a network associated with an SSID of Set 2. According to aspects, the UE may allow connection to a network associated with an SSID of Set 3 after the UE determines (e.g., concludes) the LTE network has not triggered a connection to a network associated with an SSID of Set 2.

While three SSID sets are described herein, any number of configurable sets of SSIDs may be used in accordance with aspects of the present disclosure. According to aspects, the priorities of the SSIDs may be enabled or disabled by a base station in run-time or may be pre-configured by an operator. According to aspects, the priorities may be received by a UE in a policy file and/or may be configured in a policy file, as opposed to being provided by an operator. In particular, Set 2 may be identified via a Broadcast Control Channel (BCCH) and Set 3 may be identified by a 3GPP Access Network and Discovery Function (ANDSF) policy.

Figure 5:
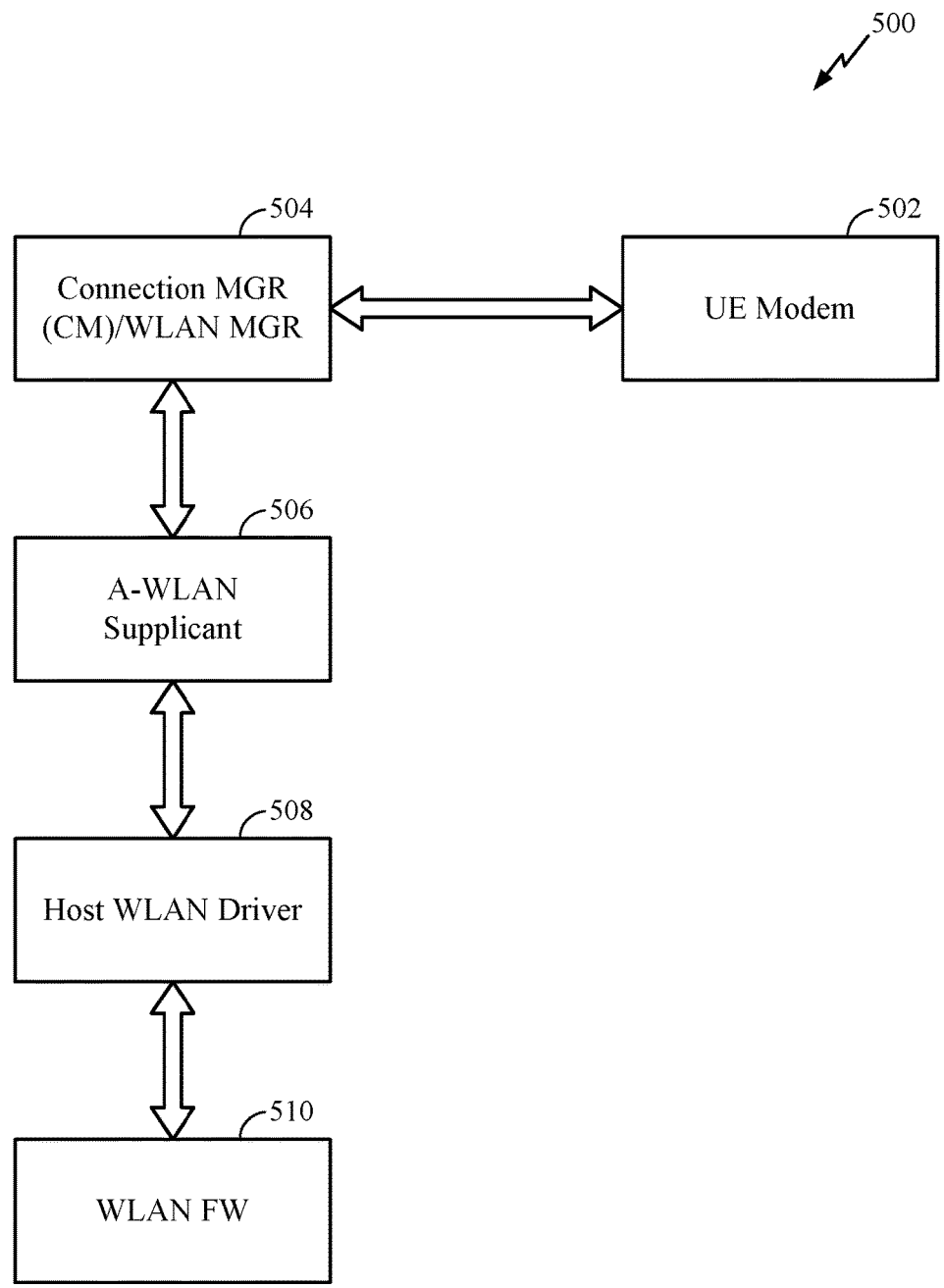
FIG. 5 is a block diagram illustrating an architecture capable of implementing network identifier (e.g., SSID) prioritization, in accordance with certain aspects of the present disclosure.

FIG. 5 illustrates an example architecture 500, which may be used to implement aspects of the present disclosure in a UE. The components illustrated in FIG. 5 may be implemented in a UE. According to aspects, an LTE eNB may broadcast signaling indicating support for LTE managing WLAN (to enable features such as LWA, LWIP, RCLWI). The eNB may also broadcast network identifiers associated Set 2. The LTE network may also provide identifiers associated Set 3 via ANDSF. A UE camping on an LTE eNB may look for a signal indicating support for LTE managing WLAN in an effort to determine whether SSID prioritization, as described herein, should be enabled.

When an LTE eNB broadcasts support for LTE managing WLAN connectivity, the UE's modem 502 may transmit an indication (e.g., Boolean) to a connection manager (CM)/WLAN manager 504 in an effort to enable LTE managing WLAN connectivity (e.g. LWA) and SSID prioritization. The UE modem 502 may receive the on/off switching signal for prioritization, as well as identifiers for Set 2 and Set 3. Prioritization may occur even in an RRC idle mode and/or an RRC connected mode. If the UE is camped on an LTE eNB that does not support LTE managing WLAN connectivity or if the UE is camped on any other RAT that does not support LTE managing WLAN connectivity, the UE may not enable the prioritization.

The WLAN manger 504 may communicate with an Aggregation-WLAN (A-WLAN) Supplicant 506. The A-WLAN Supplicant 506 may communicate with a Host WLAN Driver 508. The Host WLAN Driver 508 may communicate with, control, and/or interface with the WLAN Firmware (FW) 510. The WLAN firmware may be located on a WLAN chip. The CM/WLAN manger 504, A-WLAN Supplicant 506, Host WLAN Driver 508, and WLAN FW 510 may be part of an interface between the UE modem 502 and a Wi-Fi chip. The CM/WLAN manger 504, A-WLAN Supplicant 506, Host WLAN Driver 508, and WLAN FW 510 may be part of an applications processor, WLAN processor, and/or modem processor of the UE. A Wi-Fi modem and WWAN modem may be part of the same chip.

SSID prioritization may be triggered by the modem 502 and may occur at one or more of the CM/WLAN manger 504, WLAN Supplicant 506, Host WLAN Driver 508, and with WLAN Firmware 510. According to aspects, SSID prioritization may be enabled by the UE receiving a broadcast indication from an LTE eNB that supports LTE managing WLAN connectivity, including, for example, aggregation of LTE and Wi-Fi.

When prioritization is enabled, if the UE is connected to a network associated with (e.g., having) an SSID in the set of SSIDs having highest priority, the UE may remain connected to it and additionally not perform scanning as requested by the modem. In other words, scanning for other networks having a set of SSIDs with lower priority may not be performed, since the UE is already connected to a network associated with the highest priority SSID. According to aspects, scanning may occur when the UE is connected to a network associated with an SSID having a highest priority, in an effort to find other APs associated with SSIDs belonging to network identifier sets with the highest priority.

If, however, the UE is connected to a network associated with an SSID that is not associated with the network identifier set having the highest priority, and prioritization is enabled, the UE may attempt to connect to a network based at least in part the priorities of the network identifiers SSID sets. According to aspects, the UE may disconnect from the network associated with the SSID of a lower priority set and use LTE until LTE commands a connection to a network in associated with an SSID in Set 2. The UE may not allow connection to a network associated with an SSID of Set 3 as long as the UE is connected to LTE, even when LTE does not command a connection to a network associated with an SSID of Set 2. According to aspects, the UE may allow connection to a network associated with an SSID of Set 3 after the UE determines (e.g., concludes) the LTE network has not triggered a connected to a network associated with an SSID of Set 2. Accordingly, the UE may attempt to connect to a network based, at least in part, on priorities which are fed to the UE's CM/WLAN manager 504.

According to aspects, when the UE is connected to a network associated with an SSID that is not associated with the set of SSIDs of highest priority, and prioritization is enabled, the UE may perform a periodic scan of SSIDs. For illustrative purposes, the below example of prioritization uses three sets of SSIDs, with Set 1 having a higher priority than Set 2, and Set 2 having a higher priority than Set 3 (e.g., Set 1>Set 2>Set 3). As described above, Set 1 may include SSIDs of high-priority Wi-Fi networks, Set 2 may include SSIDs for LTE-WLAN aggregation, and Set 3 may include SSIDs for lower priority Wi-Fi networks. Set 1 and Set 3 may both include SSIDs for Wi-Fi networks; however, Set 1 may include SSIDs configured by a user and Set 3 may include SSIDs configured by an operator. Therefore, according to aspects, Set 1 may have a higher priority than Set 3.

In one example, the UE may suppress scan results of networks associated with lower priority SSIDs or disconnect from networks associated with lower priority SSIDs when a network associated with a higher priority SSID is present in the scan results. Assuming the UE is not connected to a network associated with an SSID in Set 1 and prioritization is enabled, the UE may perform a periodic scan of SSIDs. When the scan response includes an SSID in Set 2, and at least one AP associated with (e.g., having) an SSID in Set 2 has a received signal strength indication (RSSI) that exceeds a threshold, the UE may request suppression (e.g., hiding) of all SSIDs discovered from the scan which belong to a set with a lower priority than Set 2 (e.g., suppression of all SSIDs belonging to Set 3). Accordingly, in this case, the user may be unaware of the presence or not see the SSIDs belonging to Set 3. According to aspects, the UE may remove/hide/suppress networks having lower priority SSIDs when a network associated with a higher priority SSID is discovered and when the network associated with the higher priority SSID meets some quality requirements (e.g., RSSI exceeding a threshold value). According to aspects, methods described herein may not suppress a network that is the only choice.

In one example, the UE may configure a CM with priorities associated with each network identifier set. The connection manager may ensure that the UE connects to an available WLAN with the highest priority. Further, the CM may temporarily disable credentials associated with a lower priority WLAN networks (e.g., networks associated with an SSID of Set 3) when a network associated with an SSID of Set 2 is present, in an effort to inhibit an automatic connection to network associated with an SSID of Set 3.

In one example, the scan response may include an SSID associated with a higher priority set than the SSID of the currently connected network. For example, the scan response may include includes an SSID in Set 2, and the UE may be connected to a network associated with an SSID of a set that has a lower priority than Set 2 (e.g., Set 3). According to aspects, the UE may disconnect from a network associated with the current SSID, connect to a network associated with the higher priority SSID discovered by the scan, and request suppression of SSID scan results of all SSIDs from lower priority SSID sets or temporary disablement of the associated SSIDs. In this example, the UE may disconnect from the network associated with the SSID of Set 3, connect to a network associated with an SSID of Set 2, and request suppression of SSID scan results from SSID sets having a priority lower than the priority of Set 2 (e.g., suppress scan results including SSIDs from Set 3).

In one example, the UE may be connected to a network associated with a higher priority SSID than an SSID discovered from scanning SSIDs. The discovered SSID may have a signal quality above a threshold. According to aspects, the UE may suppress all SSID scan responses belonging to a set of SSIDs having lower priority than the discovered SSID. For example, Set 1 may have a higher priority than Set 2, and Set 2 may have a higher priority than Set 3 (e.g., Set 1>Set 2>Set 3) and the UE may be connected to a network associated with an SSID of Set 1. When the scan response includes an SSID in Set 2 with a signal quality above a threshold, the UE may suppress all SSID scan results associated with SSIDs of Set 3, because Set 3 SSIDs have a lower priority than Set 2 SSIDs. Since the HLOS of the UE may have credentials for SSIDs of Set 3, suppression of Set 3 SSIDs may avoid a race condition between (1) a modem requesting a connection to a network associated with an SSID in Set 2 and (2) the UE HLOS connecting to a network associated with an SSID in Set 3 SSID, upon losing the connection to the network associated with and SSID in Set 1.

In one example, the UE may be connected to network associated with an SSID of Set 3 and may subsequently connect to a higher priority network, for example, a network associated with an SSID of Set 2. After the UE has disconnected from a network associated with an SSID of Set 3 and connected to a higher priority network associated with an SSID of Set 2, in a failure scenario, the UE may lose the connection to the network associated with the SSID of Set 2. According to aspects, the UE may store the last SSID of Set 3 from which the UE was disassociated from and may automatically reconnect to a network using the last stored SSID of Set 3. By avoiding additional scanning, the UE may save time and network resources and may minimize disruption to a user's experience.

According to the prioritization techniques described above, a UE may disassociate from a lower priority network in favor of a higher priority network. For example, the prioritization techniques described in the present disclosure may be performed after an LTE network requests that the UE connect to an AP associated with an SSID in Set 2, while the UE is connected to a network associated with an SSID of Set 3.

According to aspects, the UE may scan for an SSID associated with Set 2, while connected to a network associated with an SSID of Set 1 (Set 1, in this example has a higher priority than Set 2). The UE may report the SSID of Set 2 to an eNB for possible, future connections. This may allow for potential, quick connection to a network having an SSID associated with Set 2 if the connection to a network associated with an SSID from Set 1 is dropped.

FIG. 6A illustrates example operations 600A, which may be performed by UE in accordance with aspects of the present disclosure. Operations 600A may be performed by one or more modules of a UE 115-a illustrated in FIG. 1 which may include one or more components illustrated in FIGS. 2, 3, and 5. For example, the processor 270 and memory 272 illustrated in FIG. 2, the processor 304, memory 306 illustrated in FIG. 3, and the CM/WLAN manger 504, WLAN Supplicant 506, Host WLAN Driver 508, and/or WLAN Firmware 510 illustrated in FIG. 5 may perform the operations described herein.

As described above, aspects of the present disclosure provide techniques to prioritize access across sets of WLAN networks. At 602A, the UE may obtain network identifier (e.g., SSID) sets, each set having one or more network identifiers (SSIDs) for a first RAT and a priority level. At 604A, the UE may determine one or more of the network identifier sets that are under control of a second RAT. For example, the UE may detect a base station that supports aggregation of at least the second RAT and the first RAT. Additionally or alternatively, the UE may detect presence of traffic steering. Additionally or alternatively, the UE may receive an indication from the second RAT indicating support for the second RAT managing first RAT connectivity. For example, the UE may receive an indication from an LTE eNB indicating support for LTE managing WLAN connectivity using an SSIDs in Set 2 (e.g., LWA).

At 606A, the UE may enable prioritization. As described above, a base station may transmit a broadcast signal indicating support of the second RAT managing WLAN connectivity (e.g., LWA), which may enable prioritization at the UE.

At 608A, the UE may manage connections to the first RAT based, at least in part, on the priorities of the network identifier sets. According to one, non-limiting example, the first RAT may be Wi-Fi and the second RAT may be LTE. At 610A, the UE may scan network identifier (SSID) sets if the UE is not connected to an AP in a network identifier (SSID) set with a highest priority.

At 612A, the UE may disconnect (e.g., using a WWLAN modem, WLAN modem, and/or WLAN driver at the UE) from, or inhibit connection to the network associated with current network identifier set when another network identifier set is found with a higher priority than the currently associated network identifier and the signal quality of the other network is above a threshold. At 614A, the UE may connect to a network associated with a network identifier with a higher priority.

According to aspects, at 616A, the UE may request all network identifiers from the lower priority set be suppressed (e.g., hidden or removed) in scan responses. If a base station is not capable of LTE managing WLAN connectivity, lower priority sets of network identifiers may not be hidden or disconnected. As described above, connection to networks using Set 1 and Set 3 may be performed automatically by the HLOS, whenever they are detected. When a scan response includes an SSID in Set 2 with a signal quality above a threshold, the UE may suppress all SSID scan results associated with SSIDs of Set 3, because Set 3 SSIDs have a lower priority than Set 2 SSIDs. Since the HLOS of the UE may have credentials for SSIDs of Set 3, suppression of Set 3 SSIDs may avoid a race condition between (1) a modem requesting a connection to a network associated with an SSID in Set 2 and (2) the UE HLOS connecting to a network associated with an SSID in Set 3 SSID, upon losing the connection to the network associated with and SSID in Set 1. When a base station is not capable of LTE managing WLAN connectivity, the race condition may not occur and therefore, the UE may not suppress or hide SSIDs associated with lower priority sets than the currently associated network identifier. According to aspects, in case an LTE eNB does not inform the UE about its capability of managing WLAN connectivity, the UE may apply prioritization anytime it is under the coverage of LTE, or while other localization conditions are met. The localization conditions may include a Public Land Mobile Network (PLMN) Identifier, a tracking area (TA) identifier, a cell ID identifier and such.

FIG. 6B illustrates example operations 600B, which may be performed by UE in accordance with aspects of the present disclosure. Operations 600B may be performed by one or more modules of a UE 115-a illustrated in FIG. 1 which may include one or more components illustrated in FIGS. 2, 3, and 5. For example, the processor 270 and memory 272 as illustrated in FIG. 2, the processor 304 and memory 306 illustrated in FIG. 3 and/or the CM/WLAN manger 504, WLAN Supplicant 506, Host WLAN Driver 508, and/or WLAN Firmware 510 illustrated in FIG. 5 may perform the operations described herein.

As shown in FIG. 6B, a UE may perform operations 602B, 604B, 606B, 608B, 6010B, and 612B as described herein with reference to steps 602A-612A of FIG. 6A.

As shown at steps 612A-616A of FIG. 6A, a UE may, disconnect from the network of the currently associated network identifier set, connect to a network associated with a higher priority SSID, and request all SSIDs from lower priority sets be suppressed. According to aspects, the UE may, at 612B, disconnect from a currently associated network and may, at 614B, request suppression of SSIDs associated with lower priority SSID sets from scan response, without connecting to a network of higher priority (e.g., 614A from FIG. 6A). In other words, as illustrated in FIG. 6B, a UE may suppress lower-priority scan results and disconnect from a lower-priority network independent of connecting to another network. Suppression of scan results and disconnecting from a network may be controlled, at least in part, on broadcast signaling from an eNB. A UE connecting to another network may be further based, at least in part, on a separate trigger (e.g., unicast signaling from an eNB). Accordingly, the UE may suppress and disconnect from one network without necessarily connecting to another network. Therefore, according to an aspect illustrated in FIG. 6B, the UE may, at 612B, disconnect from the currently associated SSID and, at 614B, request suppression of all lower priority SSIDs.

Figure 7:
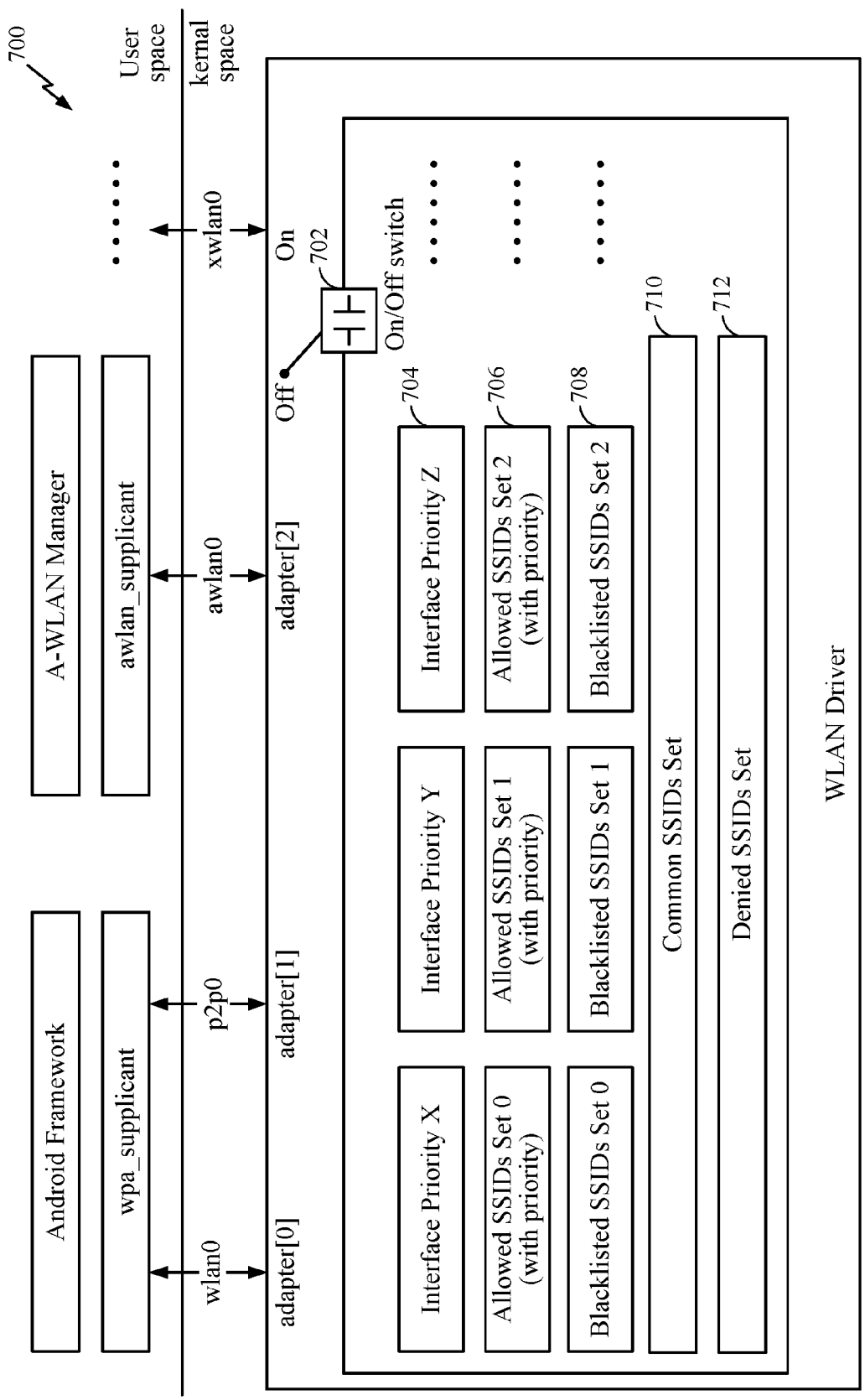
FIG. 7 illustrates an example architecture, which may implement operations described herein, in accordance with certain aspects of the present disclosure.

FIG. 7 illustrates an example architecture 700, which may implement the operations 600A, and 600B and the methods described herein. A global on/off switch 702 represents the ability to enable and/or disable SSID prioritization at a UE. For example, the modem may trigger the on/off switch after receiving a signal from an LTE eNB broadcasting an indication of support for LTE managing WLAN connectivity via Broadcast Control Channel or other signaling. The modem of the UE may then send an indication to a connection manager (CM) to enable A-WLAN and SSID prioritization.

As illustrated, the UE may have three sets of SSIDs (Set 0, Set 1, and Set 2), wherein each set is associated with a priority. While aspects described herein refer to three sets of SSIDs, any number of sets may be used in the prioritization methods and apparatuses described herein.

According to one example, each set of SSIDs (Set 0, Set 1, and Set 2) may be associated with an Interface Priority module 704, Allowed SSIDs Set 706, and Blacklisted SSIDs 708. For example, wlan0 (HLOS WLAN), p2p0 (Peer-to-Peer), and awlan0 may each represent an interface. Their respective interface priority may indicate the priority of the interface's connection relative to the other interfaces. According to one example, awlan0 may represent an LTE managed WLAN connection, which may have a higher priority (e.g., Priority X) than the illustrated p2p0 Wi-Fi connection (e.g., Priority Y). The interface priority may be configured by an external operator or at runtime, for instance through signaling.

Allowed SSIDs (e.g., A-SSIDs) 706 may indicate which SSIDs may be used to establish a connection for each respective interface. A UE may accept a connection to a network using SSIDs indicated in this set. For example, a UE may accept a connection via an SSID of the Allowed SSIDS Set 0 when trying to connect to a wlan0 network.

Blacklisted SSIDs (e.g., B-SSIDs) 708 may indicate which SSIDs are hidden or suppressed from the scan results. According to the prioritization method, UEs may reject connection requests associated with SSIDs included in this set.

Common SSIDs (C-SSIDs) 710 and Denied SSIDs (D-SSIDs) 712 may span two or more interfaces. SSIDs included in the C-SSIDs and D-SSIDs may span all of the interfaces. C-SSIDs may indicate which SSIDs are shared between interfaces. D-SSIDs may indicate which SSIDs may not be used to access a network for certain interfaces.

Figure 8:
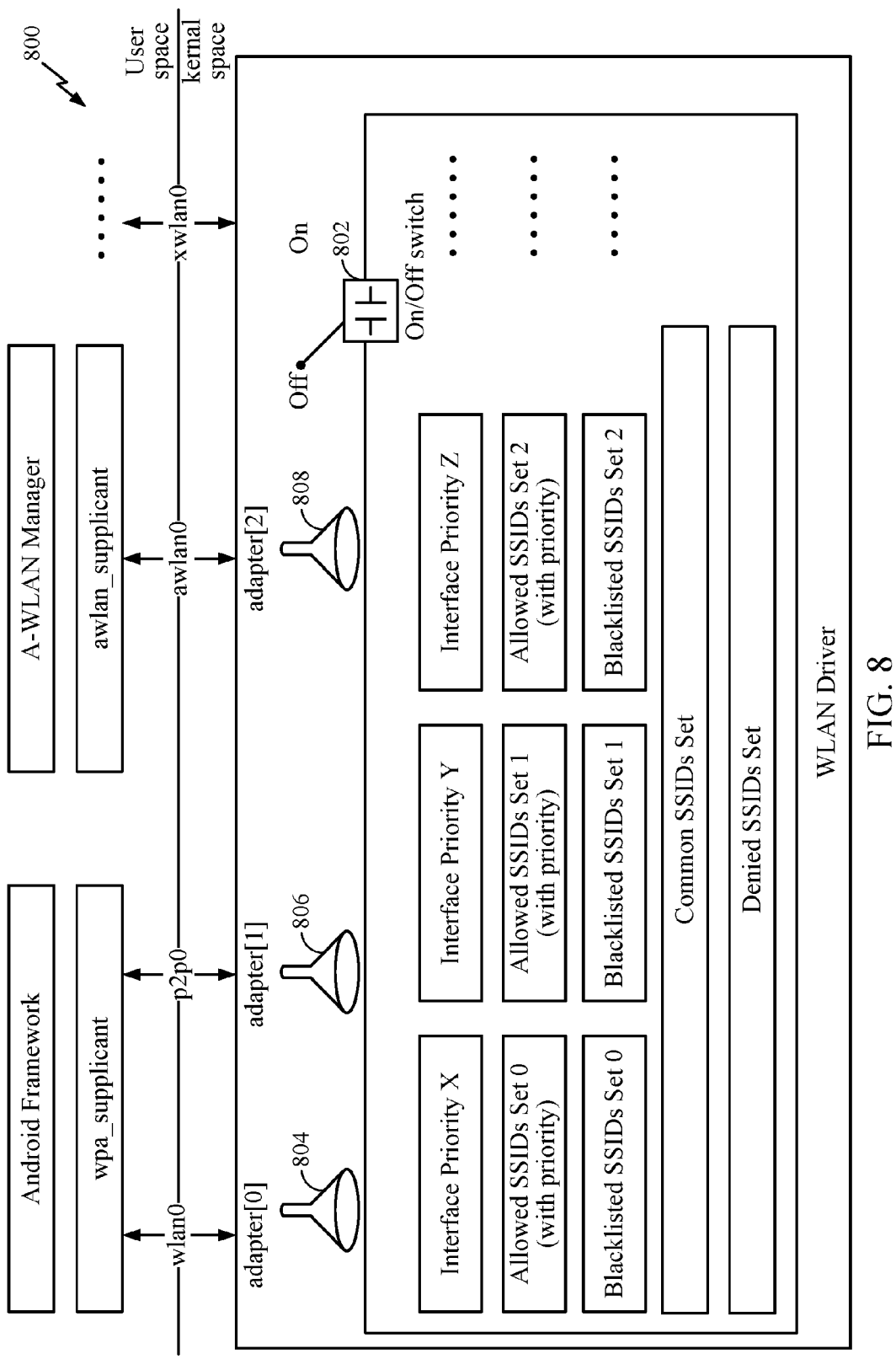
FIG. 8 illustrates an example of a disabled state, wherein network identifier prioritization is not enabled at a UE, in accordance with certain aspects of the present disclosure.

FIG. 8 illustrates an example of a disabled state 800, wherein SSID prioritization is not enabled at a UE. SSID prioritization may be enabled or disabled in run-time by any of the interfaces illustrated in FIG. 8. As shown, the global on/off switch 802 is illustrated as being in the off position. Filters 804, 806, and 808 may represent rules used to determine what, if any action, the UE should take (e.g., suppress SSID, connect to a different network, etc.) based on scanning results. As the global on/off switch 802 is in the off position, SSID prioritization is disabled and no filters 804, 806, or 808 may be active.

Figure 9:
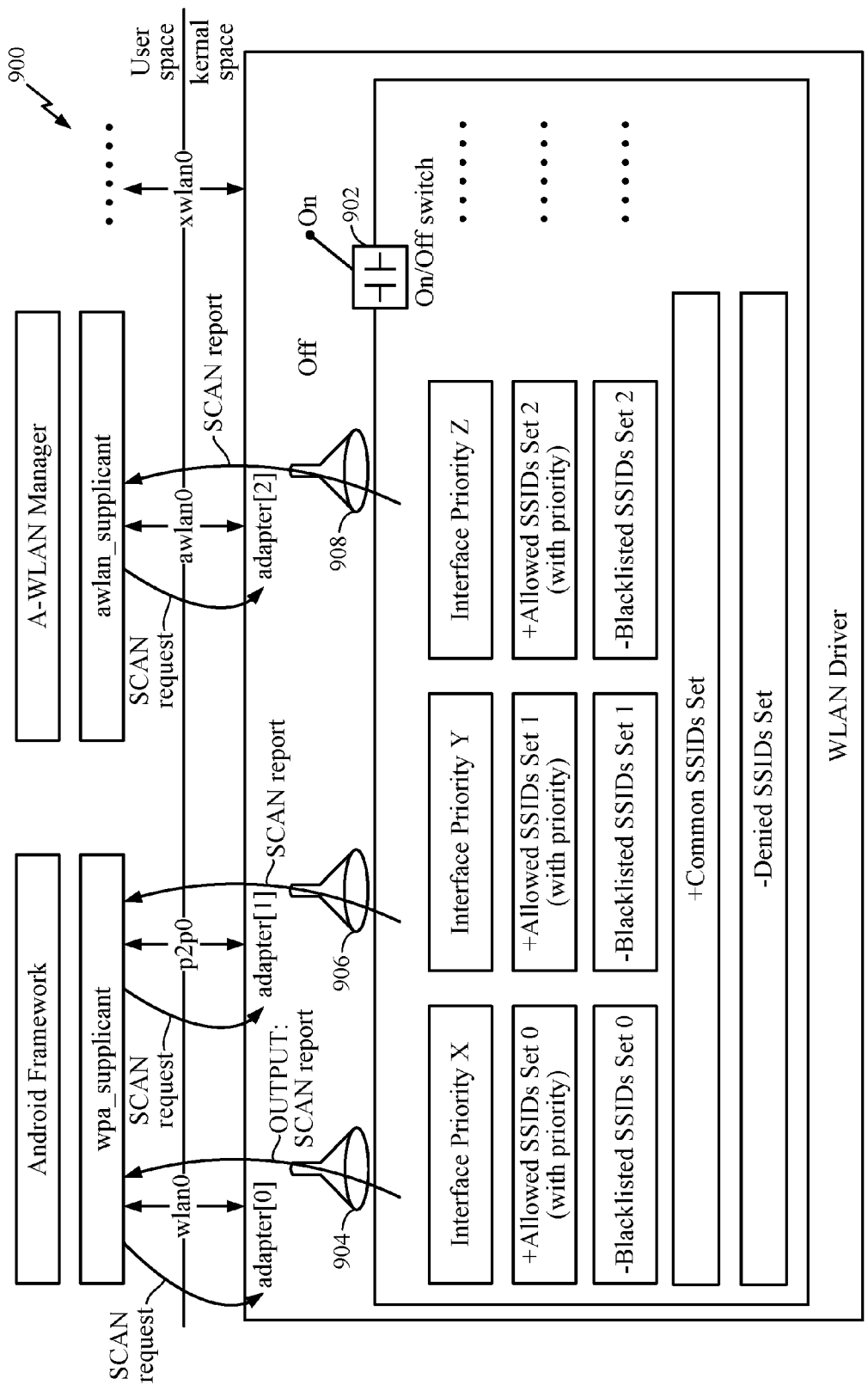
FIG. 9 illustrates an example of an enabled state, wherein network identifier prioritization is enabled at a UE, in accordance with certain aspects of the present disclosure.

FIG. 9 illustrates an example of an enabled state 900, wherein SSID prioritization is enabled at a UE. The global on/off switch 902 in the on position indicates that SSID prioritization is enabled. Accordingly, the UE may use filters 904, 906, and 908, and scan filter rules, in an effort to prioritize SSIDs. If the input scan results indicate a pass, the discovered SSID may be reported to upper layers (e.g., Wi-Fi protected access (WPA) Supplicant and/or A-WLAN Supplicant). If the result of the scan filter rule indicates a drop, the SSID may be excluded from the scan report, and the SSID may be suppressed or hidden.

Figure 10:
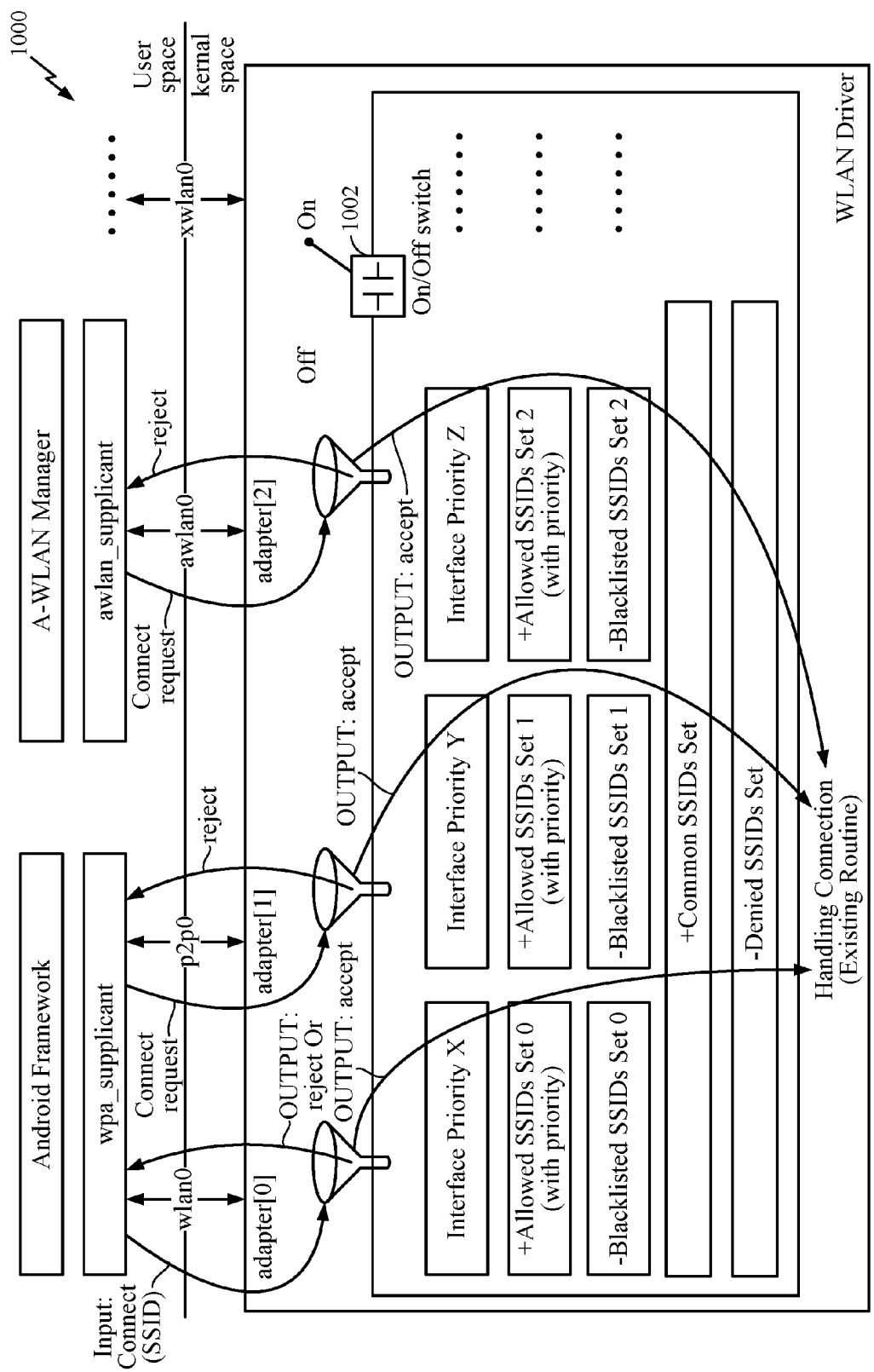
FIG. 10 illustrates an example architecture implementing network identifier connection rules, in accordance with aspects of the present disclosure.

FIG. 10 illustrates an example of an architecture implementing SSID connection rules 1000, according to aspects of the present disclosure. When the global on/off switch 1002 is in the on state, connection rules may be applied after scan filter rules. The following example assumes that the current connection interface has a priority of X and the requested interface has a priority of Y.

When no interface is connected, there is no need of a filter and the requested SSID is accepted. When X has a lower priority than Y (X<Y), the connection filer rules may be performed. If the result is an accept, the UE may disconnect from the current SSID and connect to a network using the requested SSID. If the result is a reject, the connection filter rules may return an error.

When X has a higher priority than Y (X>Y), the connection rules may return an error for connecting using the requested SSID.

When X and Y are of equal priority (X==Y), the UE may maintain the current SSID association. According to aspects, in a Multi-Channel Concurrency scenario, the UE may accept the connection request using the requested SSID.

As described herein, aspects provide techniques for prioritizing WLAN access by dividing SSIDs into prioritized set. Advantageously, the prioritization techniques described herein may allow a multi-mode UE to detect and connect to an LTE network (e.g., LWA) based on priority rules.

While particular examples of the present disclosure have been described with reference to LWA and SSIDs, those skilled in the art will recognize that the techniques may be more broadly applied to systems that support aggregation of any different types of RATs using any type of network identifiers. Further, those skilled in the art will recognize that the particular priority rules and example filters described herein as examples are illustrative only and that the techniques described herein for network identifier set prioritization may be implemented in any suitable manner.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor.

According to certain aspects, such means may be implemented by processing systems configured to perform the corresponding functions by implementing various algorithms (e.g., in hardware or by executing software instructions) described above.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
obtaining one or more network identifier sets, each of the one or more network identifier sets having one or more network identifiers for a wireless local area network (WLAN) and a priority level, wherein the network identifier sets comprise:
a first network identifier set with one or more network identifiers corresponding to credentials for networks that support Long Term Evolution (LTE) managing WLAN connectivity; and
a second network identifier set with one or more network identifiers corresponding to one or more credentials configured by an operator, wherein the second network identifier set is configured by one of an Access Network and Discovery Function (ANDSF) or a high-level operating system (HLOS) configured by the operator;
determining one or more of the network identifier sets that are under control of the LTE network; and
after determining that one or more of the network identifier sets are under control of the LTE network, managing connections to the WLAN based, at least in part, on the priority level of the one or more network identifier sets.

2. The method of claim 1, wherein the priority level of the network identifier sets are configurable.

3. The method of claim 1, wherein determining one or more of the network identifier sets are under control of the LTE network is based on an indication broadcast from a base station.

4. The method of claim 3, wherein the indication is a LTE network indication which indicates support for LTE managing WLAN connectivity.

5. The method of claim 1, further comprising receiving signaling enabling or disabling managing connections to the WLAN based on the priority level.

6. The method of claim 1, wherein the network identifier sets comprise:

a third network identifier set with one or more high-level operating system (HLOS) network identifiers corresponding to one or more credentials configured by a user of the UE.

7. The method of claim 1, wherein managing connections to the WLAN comprises:
determining the UE is within a coverage area of at least one network identifier in the first network identifier set and at least one network identifier in the second network identifier set; and
preventing a connection to the WLAN using the at least one network identifier in the second network identifier set when the WLAN is under control of the LTE network.

8. The method of claim 1, wherein managing connections to the WLAN comprises:
determining the UE is not connected to a network associated with a highest priority network identifier set; and
attempting a connection to a network according to the priority level of the network identifier sets.

9. The method of claim 1, wherein managing connections to the WLAN comprises:
determining the UE is not connected to a network associated with a highest priority network identifier set;
performing a periodic scan for available network identifiers based on the determination; and
establishing a connection using a network identifier discovered via the periodic scan when a network signal quality associated with the discovered network identifier is greater than a threshold.

10. The method of claim 9, further comprising:
suppressing or disabling credentials for one or more network identifiers, discovered via the scan, that belong to a network identifier set having a lower priority than a set that contains the network identifier of the established connection.

11. The method of claim 9, further comprising:
reporting, to a base station, one or more network identifiers, discovered via the scan, that belong to a network identifier set having a higher priority than a set that contains the network identifier of the established connection.

12. The method of claim 9, further comprising:
terminating a current connection associated with a network identifier that belongs to a network identifier set having a lower priority than at least two of the network identifier sets.

13. A method for wireless communication by a user equipment (UE), comprising:
obtaining one or more network identifier sets, each of the one or more network identifier sets having one or more network identifiers for a first radio access technology (RAT) and a priority level;
determining one or more of the network identifier sets that are under control of a second RAT; and
after determining that one or more of the network identifier sets are under control of the second RAT, managing connections to the first RAT based, at least in part, on the priority level of the one or more network identifier sets, wherein managing connections to the first RAT comprises:
determining the UE is not connected to a network associated with a highest priority network identifier set;
performing a periodic scan for available network identifiers based on the determination;
establishing a connection using a network identifier discovered via the periodic scan when a network signal quality associated with the discovered network identifier is greater than a threshold;
terminating a current connection associated with a network identifier that belongs to a network identifier set having a lower priority than at least two of the network identifier sets;
storing the network identifier associated with the terminated connection; and
re-establishing a connection using the stored network identifier when an established connection using a higher priority network identifier is terminated.

14. An apparatus for wireless communication by a user equipment (UE), comprising:
at least one processor configured to:
obtain one or more network identifier sets, each of the one or more network identifier sets having one or more network identifiers for a wireless local area network (WLAN) and a priority level, wherein the network identifier sets comprise:
a first network identifier set with one or more network identifiers corresponding to credentials for networks that support for Long Term Evolution (LTE) network managing WLAN connectivity; and
a second network identifier set with one or more network identifiers corresponding to one or more credentials configured by an operator, wherein the second network identifier set is configured by one of an Access Network and Discovery Function (ANDSF) or a high-level operating system (HLOS) configured by the operator;
determine one or more of the network identifier sets that are under control of the LTE network; and
after the determining, manage connections to the WLAN based, at least in part, on the priority level of the one or more network identifier sets; and
a memory coupled to the at least one processor.

15. The apparatus of claim 14, wherein the priority level of the network identifier sets are configurable.

16. The apparatus of claim 14, wherein the determining one or more of the network identifier sets are under control of the LTE network is based on an indication broadcast from a base station.

17. The apparatus of claim 16, wherein the indication is a LTE network indication which indicates support for WLAN connectivity.

18. The apparatus of claim 14, wherein the at least one processor is further configured to receive signaling enabling or disabling managing connections to the WLAN based on the priority level.

19. The apparatus of claim 14, wherein the network identifier sets comprise:
a third network identifier set with one or more high-level operating system (HLOS) network identifiers corresponding to one or more credentials configured by a user of the UE.

20. The apparatus of claim 14, wherein managing connections to the WLAN comprises:
determining the UE is within a coverage area of at least one network identifier in the first network identifier set and at least one network identifier in the second network identifier set; and preventing a connection to the WLAN using the at least one network identifier in the second network identifier set when the WLAN is under control of the LTE network.

21. The apparatus of claim 14, wherein the at least one processor is configured to manage connections to the WLAN by:
  determining the UE is not connected to a network associated with a highest priority network identifier set; and
  attempting a connection to a network according to the priority level of the network identifier sets.

22. The apparatus of claim 14, wherein the at least one processor is configured to manage connections to the WLAN by:
  determining the UE is not connected to a network associated with a highest priority network identifier set;
  performing a periodic scan for available network identifiers based on the determination; and
  establishing a connection using a network identifier discovered via the periodic scan when a network signal quality associated with the discovered network identifier is greater than a threshold.

23. The apparatus of claim 22, wherein the at least one processor is further configured to:
  suppress or disable one or more network identifiers, discovered via the scan, that belong to a network identifier set having a lower priority than a set that contains the network identifier of the established connection.

24. The apparatus of claim 22, wherein the at least one processor is further configured to:
  report, to a base station, one or more network identifiers, discovered via the scan, that belong to a network identifier set having a higher priority than a set that contains the network identifier of the established connection.

25. The apparatus of claim 22, wherein the at least one processor is further configured to:
  terminate a current connection associated with a network identifier that belongs to a network identifier set having a lower priority than at least two of the network identifier sets.

26. An apparatus for wireless communication by a user equipment (UE), comprising:
  at least one processor configured to:
    obtain one or more network identifier sets, each of the one or more network identifier sets having one or more network identifiers for a first radio access technology (RAT) and a priority level;
    determine one or more of the network identifier sets that are under control of a second RAT; and
    after determining that one or more of the network identifier sets are under control of the second RAT, manage connections to the first RAT based, at least in part, on the priority level of the one or more network identifier sets, wherein managing connections to the first RAT comprises:
      determining the UE is not connected to a network associated with a highest priority network identifier; set
      performing a periodic scan for available network identifiers based on the determination;
      establishing a connection using a network identifier discovered via the periodic scan when a network signal quality associated with the discovered network identifier is greater than a threshold;
      terminating a current connection associated with a network identifier that belongs to a network identifier set having a lower priority than at least two of the network identifier sets;
      storing the network identifier associated with the terminated connection; and
      re-establishing a connection using the stored network identifier when an established connection using a higher priority network identifier is terminated.

27. An apparatus for wireless communication, comprising:
  means for obtaining, by a user equipment (UE), network identifier sets, each of the one or more network identifier sets having one or more network identifiers for a wireless local area network (WLAN) and a priority level, wherein the network identifier sets comprise:
    a first network identifier set with one or more network identifiers corresponding to credentials for networks that support for Long Term Evolution (LTE) managing WLAN connectivity; and
    a second network identifier set with one or more network identifiers corresponding to one or more credentials configured by an operator, wherein the second network identifier set is configured by one of an Access Network and Discovery Function (ANDSF) or a high-level operating system (HLOS) configured by the operator;
  means for determining one or more of the network identifier sets that are under control of the LTE network; and
  means for managing, after the determining, connections to the WLAN based, at least in part, on the priority level of the one or more network identifier sets.

* * * * *